United States Patent
Rubin et al.

(10) Patent No.: US 11,723,318 B2
(45) Date of Patent: Aug. 15, 2023

(54) INDOOR PLANT-GROWING SYSTEM

(71) Applicants: Matthew Sean Rubin, Churchville, NY (US); John August Merryman, Lakeville, NY (US); Anthony John DeMatteo, Churchville, NY (US)

(72) Inventors: Matthew Sean Rubin, Churchville, NY (US); John August Merryman, Lakeville, NY (US); Anthony John DeMatteo, Churchville, NY (US)

(*) Notice: Subject to any disclaimer, the term of this patent is extended or adjusted under 35 U.S.C. 154(b) by 290 days.

(21) Appl. No.: 17/190,332

(22) Filed: Mar. 2, 2021

(65) Prior Publication Data

US 2021/0267135 A1 Sep. 2, 2021

Related U.S. Application Data

(60) Provisional application No. 62/984,185, filed on Mar. 2, 2020.

(51) Int. Cl.
*A01G 9/14* (2006.01)

(52) U.S. Cl.
CPC .......... *A01G 9/143* (2013.01); *A01G 9/1438* (2013.01); *A01G 2009/1446* (2013.01)

(58) Field of Classification Search
CPC .................. A01G 9/143; A01G 9/1438; A01G 2009/1446; A01G 9/247; A01G 9/249; A01G 9/24; A01G 9/14; A01G 31/00; A01G 31/02; A01G 31/06; Y02A 40/25
USPC ............................................................ 47/17
See application file for complete search history.

(56) References Cited

U.S. PATENT DOCUMENTS

| 9,848,545 | B2 * | 12/2017 | Joseph | A01G 31/06 |
| 2019/0327907 | A1 * | 10/2019 | Ostman | H01L 25/0753 |
| 2020/0205360 | A1 * | 7/2020 | Tabakman | A01G 31/06 |

(Continued)

FOREIGN PATENT DOCUMENTS

| CA | 2518789 A1 * | 3/2006 | A01G 31/02 |
| CN | 202396211 U * | 8/2012 | Y02A 40/25 |
| DE | 19748352 A1 * | 5/1999 | A01G 9/246 |

(Continued)

OTHER PUBLICATIONS

Machine translation of DE-202004007633-U1 to CLF analytische laborgerate GmbH. (Year: 2004).*

(Continued)

*Primary Examiner* — Kathleen I Alker

(57) ABSTRACT

An indoor plant-growing system is an apparatus that includes a housing, at least one trellis, a reflective foil, at least one panel light, and a plurality of strip lights. The housing contains the at least one trellis, the at least one panel light, and the plurality of strip lights. The housing maintains an environment to grow a variety of plants, preferably, vine-type plants. The housing includes a growing chamber and a nutrient reservoir. The growing chamber houses variety of plants, and the nutrient reservoir supplies the growing chamber with a water supply and nutrients. The nutrient reservoir maintained preferably with fish in addition to at least one environmental sensor and at lease one aerator. The at least one panel light and the plurality of strip lights provide thorough lighting needed by the variety of plants. The reflective foil reflects the light to ensure lighting within a fully grown vine plant.

17 Claims, 7 Drawing Sheets

(56) References Cited

U.S. PATENT DOCUMENTS

2020/0253133 A1* 8/2020 Lewis ............... A01G 9/24
2021/0137027 A1* 5/2021 Howe ............... A01G 9/16

FOREIGN PATENT DOCUMENTS

| DE | 202004007633 U1 * | 8/2004 | ............... A01G 9/16 |
| JP | 4169925 B2 * | 10/2008 | ............ Y02A 40/25 |
| KR | 101423127 B1 * | 7/2014 | ............ A01G 31/06 |
| KR | 101951922 B1 * | 2/2019 | ............ A01G 31/06 |
| WO | WO-2020172149 A1 * | 8/2020 | ............... A01G 3/00 |

OTHER PUBLICATIONS

Machine translation of DE-19748352-A1 to Hergenroeder K H. (Year: 1999).*
Machine translation of JP-4169925-B2 to Isono K. (Year: 2008).*
Machine translation of KR-101951922-B1 to Cho, Young Chai. (Year: 2019).*
Machine translation of CN-202396211-U to Lu J. (Year: 2012).*
Machine translation of KR-101423127-B1 to Suh Mun-jin. (Year: 2014).*

* cited by examiner ances required to grow effectively and efficiently. Aquaponics requires a delicate balance of water, fish and waste to support plant growth, requiring additional labor and extreme diligence to obtain the desired conditions. The growth process takes significantly longer to begin than other known systems. Soil nutrient limitations, changing weather conditions (such as changing seasons), pests and geographical limitations often negatively affect traditional outdoor farming production.

INDOOR PLANT-GROWING SYSTEM

The current application claims a priority to the U.S. provisional patent application Ser. No. 62/984,185 filed on Mar. 2, 2020.

FIELD OF THE INVENTION

The present invention generally relates to plant systems. More specifically, the present invention is an indoor plant-growing system.

BACKGROUND OF THE INVENTION

Several systems and methods are known for growing vegetation. In recent years, there has been an increased focus on the use of hydroponic nutrient delivery systems for growing vegetation. With such hydroponic systems, vegetation is grown in water containing mineral nutrient solutions instead of the traditional methods of growing vegetation in soil. There are many benefits to growing vegetation with hydroponic techniques. It is generally believed that much higher crop yields can be produced using hydroponic growing techniques and such techniques can also be used in areas where in-ground agriculture or gardening are not possible. There are two types of hydroponic techniques that appear to be the most efficient and productive. One of these techniques is called the nutrient film technique (NFT) and includes a system which makes use of a channel that has a film of nutrient solution that runs along the bottom of the channel. This channel houses the roots of the plant with the roots sitting down into the thin film of nutrient as it flows down through the channel. In this manner, the roots receive ample food and oxygen from the system.

As is typical with the systems in the hydroponics industry which employ the NFT, the channels, and therefore the plants, are arranged on a flat plane that is located below a central source of light. The light that is emitted from the central source cascades down upon the plants located within the channel, which in turn grow upward in the direction of the source of light. In the known systems, the lumens of the light from the central source decrease as they progress in a cone shape towards the plants and the further out that the light radiates from the bulb/bulbs the weaker the intensity of the light becomes. The problem has always existed that the plants located further away from the central source of light receive less light in comparison to the plants located in the center of the grow chamber. This typically results in an uneven grow pattern and a reduction in the efficiency of the system (i.e. the plants located closer to the light source grow faster than the plants that are located further away from the light source). As a result, the plants that are located closer to the light source become taller and tend to block the light from the smaller plants that are located further away from the light source. Furthermore, hydroponic systems are generally considered the second most expensive indoor farming technique with flushing of the entire nutrient system on a 2-to-4-week basis, requiring a new cycle of complete nutrients. The wastewater produced as a byproduct of the system also needs to be disposed of in a safe or regulated manner. In addition to hydroponic drawbacks, other singular systems including aeroponics, aquaponics and traditional outdoor farming methods are subject to their own drawbacks and limitations. Aeroponics has been the most expensive growing system due to spraying of the hydroponic nutrient rich water, resulting in a loss of water due to high rate of evaporation. This problem creates constant nutrient imbal-

DETAIL DESCRIPTIONS OF THE INVENTION

Figure 1:
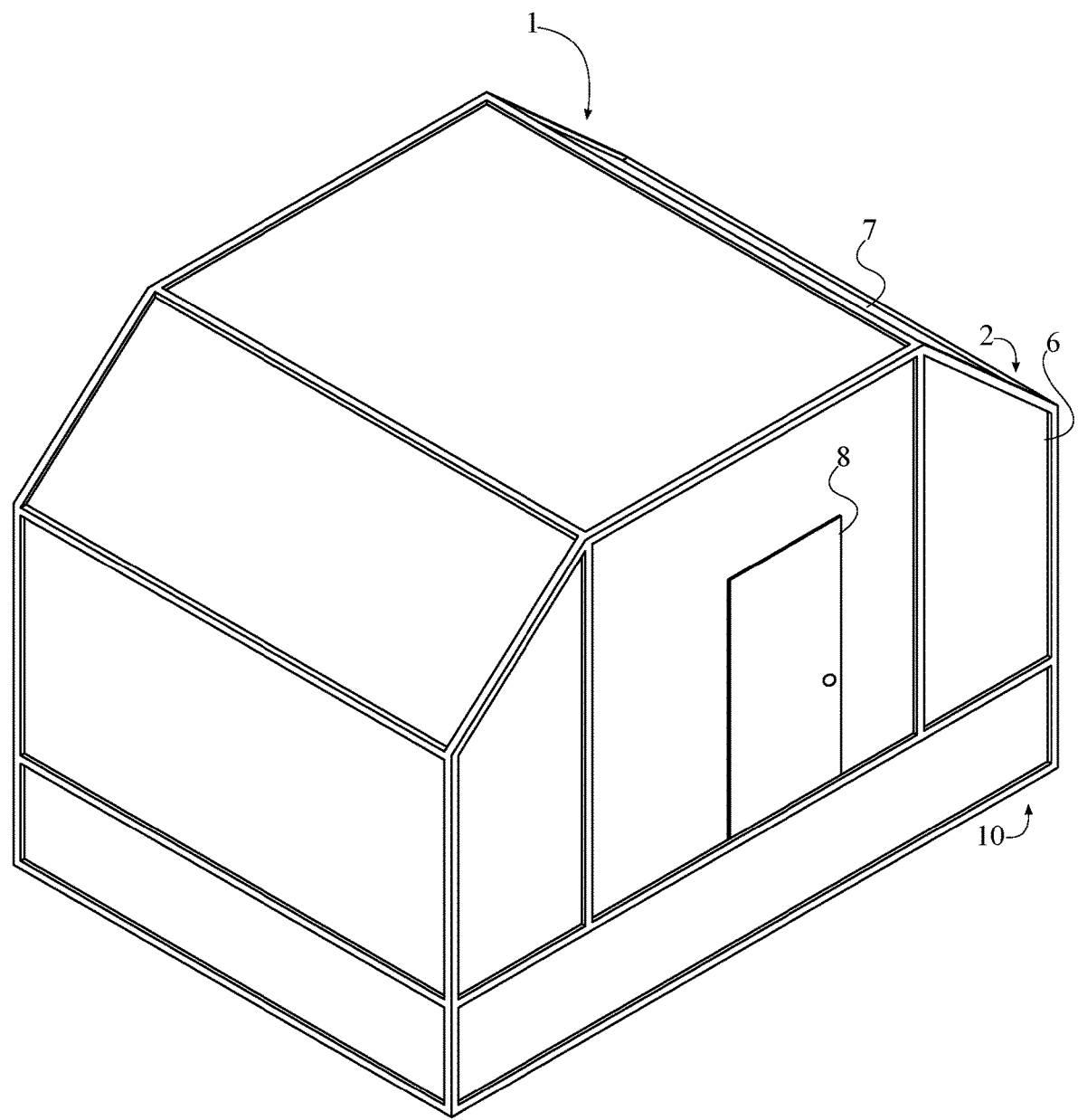
FIG. 1 is a top perspective view of a housing of the present invention.
Figure 2:
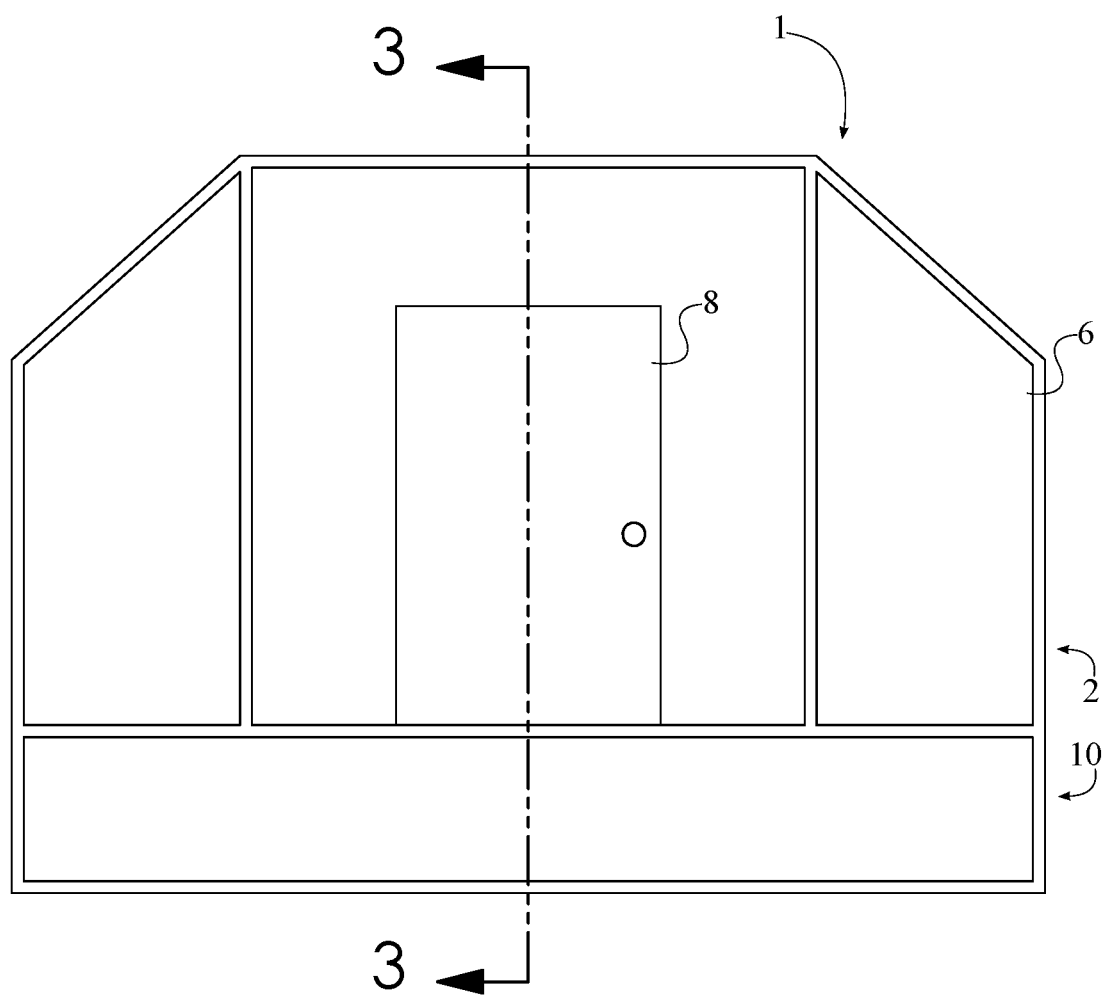
FIG. 2 is a front side view of the housing of the present invention.

All illustrations of the drawings are for the purpose of describing selected versions of the present invention and are not intended to limit the scope of the present invention.

The present invention is an indoor plant-growing system. The present invention is self-contained and provides aquaponic and aeroponic benefits in a single system. The present invention maintains the necessary conditions for a variety of plants. However, the present invention provides a thriving environment preferably for *Humulus Lupulus* plants or any vine-type plants. In order to maintain a healthy environment for vine-type plants, the present invention may comprise a housing 1, at least one trellis 12, a reflective foil 19, at least one panel light 23, and a plurality of strip lights 24, seen in FIG. 1, FIG. 2, FIG. 3, FIG. 4, FIG. 5, and FIG. 6. The housing 1 surrounds the at least one trellis 12 and defines space for the controlled environment for growing vine-type plants. The housing 1 may comprise a growing chamber 2 and a nutrient reservoir 10. The growing chamber 2 provides the space and conditions for vine-type plants to grow, and the nutrient reservoir 10 provides a maintained water and nutrient supply for vine-type plants. In order to for vine-type plants to utilize the growing chamber 2 and the nutrient reservoir 10, the growing chamber 2 may comprise a chamber floor 3, at least one perforated base plate 4, and a plurality of slots 5. The chamber floor 3 upholds the at least one trellis 12 and a user within the housing 1 above the nutrient reservoir 10. The at least one perforated base plate 4 specifically supports the at least one trellis 12 and provides a path for the roots of the vine-type plants to extend from the growing chamber 2 into the nutrient reservoir 10. Furthermore, the roots remain uninhibited by the reflective foil 19 as the root are free to extend through the plurality of slots 5. In order to aid the growth of a vine-type plant, a plurality of foam pucks integrated with seeds, vegetation, and so on, may be positioned into the at least one perforated base plate 4, and consequently, the plurality of slots 5 as well. The at least one trellis 12 supports vine-type plants while growing in any direction the vine-type plant naturally extends. In the preferred embodiment of the present invention, a width of the at least one trellis 12 is less than or equal to an arm's length so that a vine-type plant may be retrieved at any point regardless of the thickness of the shrubbery for the corresponding at least one trellis 12. The reflective foil 19 reflects the light outputted by the at least one panel light 23 and the plurality of strip lights 24 so that all areas of vine-type plants receive an equal amount of light. In the present invention, the reflective foil 19 is preferably Mylar. However, it is understood that various embodiments of the present invention may comprise a reflective foil 19 of various materials. The reflective foil 19 receive light from the at least one panel light 23 and the plurality of strip lights 24. The at least one panel light 23 and the plurality of strip lights 24 provide growing light for vine-type plants. The at least one panel light 23 and the plurality of strip lights 24, together, provide even lighting for vine-type plants, regardless of the thickness of the shrubbery.

The overall arrangement of the aforementioned components provides a thriving and manageable environment for plants to grow indoors. The vine-type plants are able to utilize both the growing chamber 2 and the nutrient reservoir 10 as the growing chamber 2 is fixed adjacent with the nutrient reservoir 10, seen in FIG. 1, FIG. 2, FIG. 3, FIG. 4, and FIG. 7. The at least one trellis 12 and the reflective foil 19 are positioned within the growing chamber 2 so that the vine-type plants may freely grow and only the roots of the vine-type plants are submerged in water. In order to reflect the light evenly across each vine-type plant that has intertwined with the at least one trellis 12, the reflective foil 19 is superimposed across the growing chamber 2. Moreover, the growing chamber 2 remains separated from the nutrient reservoir 10 as the chamber floor 3 is positioned adjacent with and across a reservoir opening 11 of the nutrient reservoir 10. The reservoir opening 11 provides ample space for the roots of the vine-type plant to freely grow and expand. The at least one perforated base plate 4 is removably mounted into the chamber floor 3, thereby providing access for the user into the nutrient reservoir 10 directly beneath the at least one trellis 12. For security and stability, the at least one trellis 12 is preferably fixed onto the at least one perforated base plate 4. The structural integrity of the reflective foil 19 remains preserved across the at least one perforated base plate 4 as the plurality of slots 5 traverses through the reflective foil 19, adjacent to the at least one perforated base plate 4. For light to shine directly upon the vine-type plants from above, the at least one panel light 23 is mounted within the growing chamber 2, opposite the chamber floor 3, and is oriented towards the at least one trellis 12. For the portions of the vine-type plants that are crowded by neighboring vine-type plants, each of the plurality of strip lights 24 are laterally mounted within the at least one trellis 12. Each of the plurality of strip lights 24 are therefore able to shine light at varying heights across the vine-type plants, regardless of the thickness of the shrubbery. Moreover, the plurality of strip lights 24 is positioned offset from each other along the at least one trellis 12, thereby providing even and effective lighting. In order for the housing 1 to effectively provide and maintain a livable environment for vine-type plants, the growing chamber 2 is in fluid communication with the nutrient reservoir 10 through the perforated base and the plurality of slots 5.

The necessary conditions for vine-type plants to grow are maintained in the growing chamber 2 as the growing chamber 2 may further comprise a lateral wall 6, a chamber roof 7, and a door 8, seen in FIG. 1, FIG. 2, FIG. 3, and FIG. 4. The lateral wall 6 surrounds the at least one trellis 12 and upholds the chamber roof 7. The chamber roof 7 encloses the growing chamber 2. The door 8 provides access for a user to enter the housing 1, specifically into the growing chamber 2. A growing chamber 2 is defined as the lateral wall 6 is positioned adjacent with the chamber floor 3, opposite the nutrient reservoir 10. Furthermore, the chamber roof 7 is positioned adjacent with the lateral wall 6, opposite the chamber floor 3. This arrangement also provides the at least one trellis 12, and consequently the vine-type plants, the necessary height. In order to provide space within growing chamber 2 for the at least one trellis 12, the lateral wall 6 is perimetrically fixed with the chamber floor 3 and the chamber roof 7. The user accesses the growing chamber 2 as the door 8 is operatively integrated into the lateral wall 6, wherein the door 8 is used to selectively access the at least one trellis 12 through the lateral wall 6.

While a user is within the growing chamber 2, harvesting a desired vine-type plant or checking on the status of the vine-type plants, the user may also tend to the nutrient reservoir 10. In order to directly access the nutrient reservoir 10, the growing chamber 2 may further comprise an access panel 9, seen in FIG. 3 and FIG. 4. The access panel 9 allows the user to view and manage the nutrient reservoir 10 from above as the nutrient reservoir 10 is filled with nutrient-treated water and a variety of fish that aid in the maintenance of the nutrient reservoir 10. More specifically, the access panel 9 is operatively integrated into the chamber floor 3, wherein the access panel 9 is used to selectively access the at last one nutrient reservoir 10 through the chamber floor 3. Access into the nutrient reservoir 10 is facilitated as the access panel 9 is positioned adjacent to the at least one perforated base plate 4. The user therefore is not inhibited by the at least one trellis 12 while accessing the nutrient reservoir 10.

Figure 3:
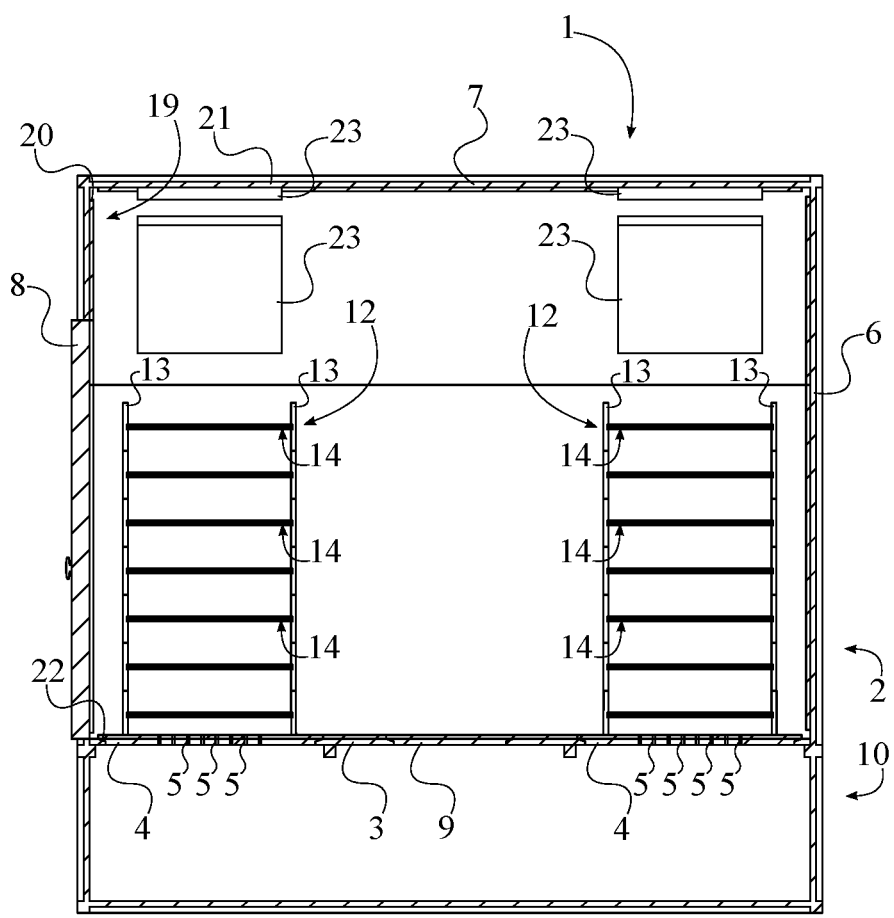
FIG. 3 is a cross-sectional view taken along line 3-3 in FIG. 2.
Figure 4:
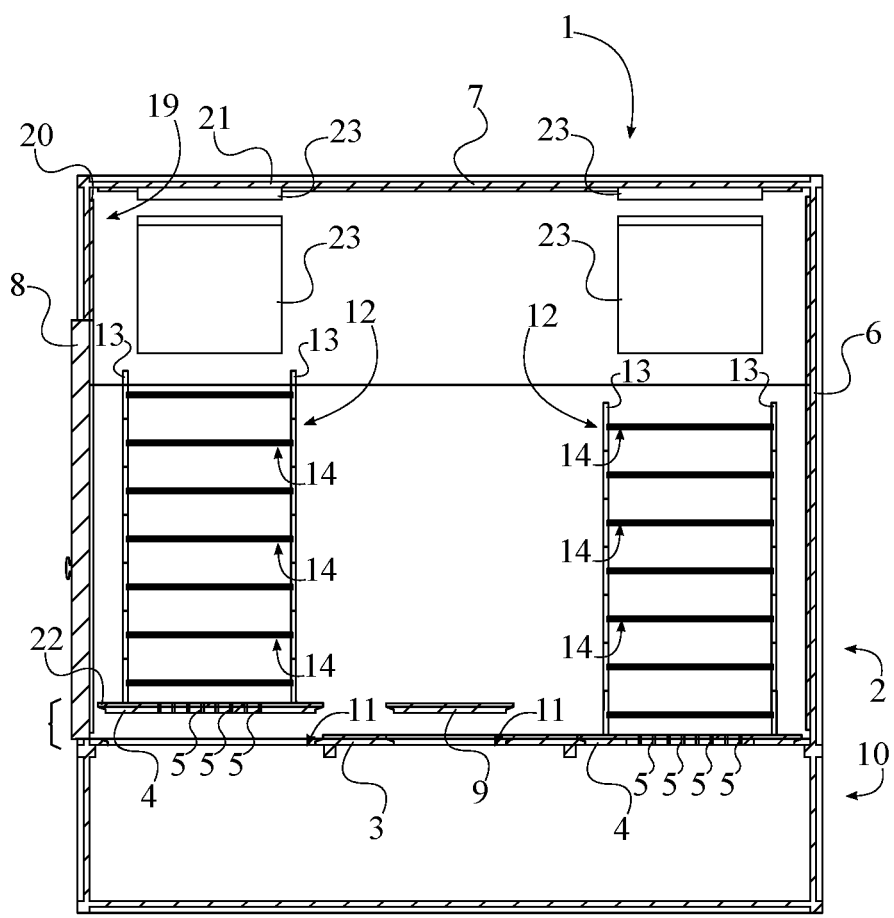
FIG. 4 is a cross-sectional view taken along line 3-3 in FIG. 2, wherein at least one perforated base plate and at least one trellis are separated from a chamber floor.

In order for the vine-type plants to receive light from above, the at least one panel light 23 is fixed across the chamber roof 7, seen in FIG. 3 and FIG. 4. More specifically, the at least one trellis 12 is positioned in between the at least one perforated base plate 4 and the at least one panel light 23. This arrangement ensures vine-type plants receive light regardless of the height of the vine-type plants.

As the vine-type plants intertwine with the at least one trellis 12 at multiple angles, the vine-type plants must also receive light from various angles. In order to minimize the number of light fixtures within the growing chamber 2, the reflective foil 19 may comprise a lateral portion 20, a roof portion 21, and a floor portion 22, seen in FIG. 3 and FIG. 4. The lateral portion 20, the roof portion 21, and the floor portion 22 reflect the light from the at least one panel light 23, as well as the plurality of strip lights 24, towards each other and, consequently, the vine-type plants. In order to provide multiple angles of light for the vine-type plants, the lateral portion 20 is superimposed across the lateral wall 6, the roof portion 21 is superimposed across the chamber roof 7, and the floor portion 22 is superimposed across the chamber floor 3. This arrangement ensures that the vine-type plants receive light even if lower portions of the vine-type plants are shielded from the at least one panel light 23 by neighboring vine-type plants.

The vine-type plants are supported while growing as the at least one trellis 12 may comprise a plurality of vertical posts 13 and a plurality of lattice shelves 14, seen in FIG. 3, FIG. 4, FIG. 5, and FIG. 6. In order for the vine-type plants to properly grow and be supported at increasing heights, each of the plurality of lattice shelves 14 may comprise a shelf frame 15 and a wire grid 18. The shelf frame 15 upholds the wire grid 18 at a specific height along the plurality of vertical posts 13. In order to accommodate the natural growth of the vine-type plants, the plurality of lattice shelves 14 is serially distributed along the plurality of vertical posts 13. The growth of the vine-type plants is maximized as each of the plurality of vertical posts 13 are fixed normal to the at least one perforated base plate 4. This arrangement promotes the upward growth of the vine-type plants. In addition to maximizing the overall length of the vine-type plants, the at least one trellis 12 promotes the intertwining structure of the vine-type plants as the shelf frame 15 is positioned parallel and offset from the at least one perforated base plate 4. This arrangement provides the necessary space for the vine-type plants to freely twist and angle while growing from a shelf frame 15 to an adjacent shelf frame 15. The growth of the vine-type plant remains uninhibited by the plurality of vertical posts 13 as the plurality of vertical posts 13 is fixed around the shelf frame 15. Moreover, each shelf frame 15 is able to uphold the vine-type plants at increasing heights as the shelf frame 15 is perimetrically connected to the wire grid 18.

Figure 5:
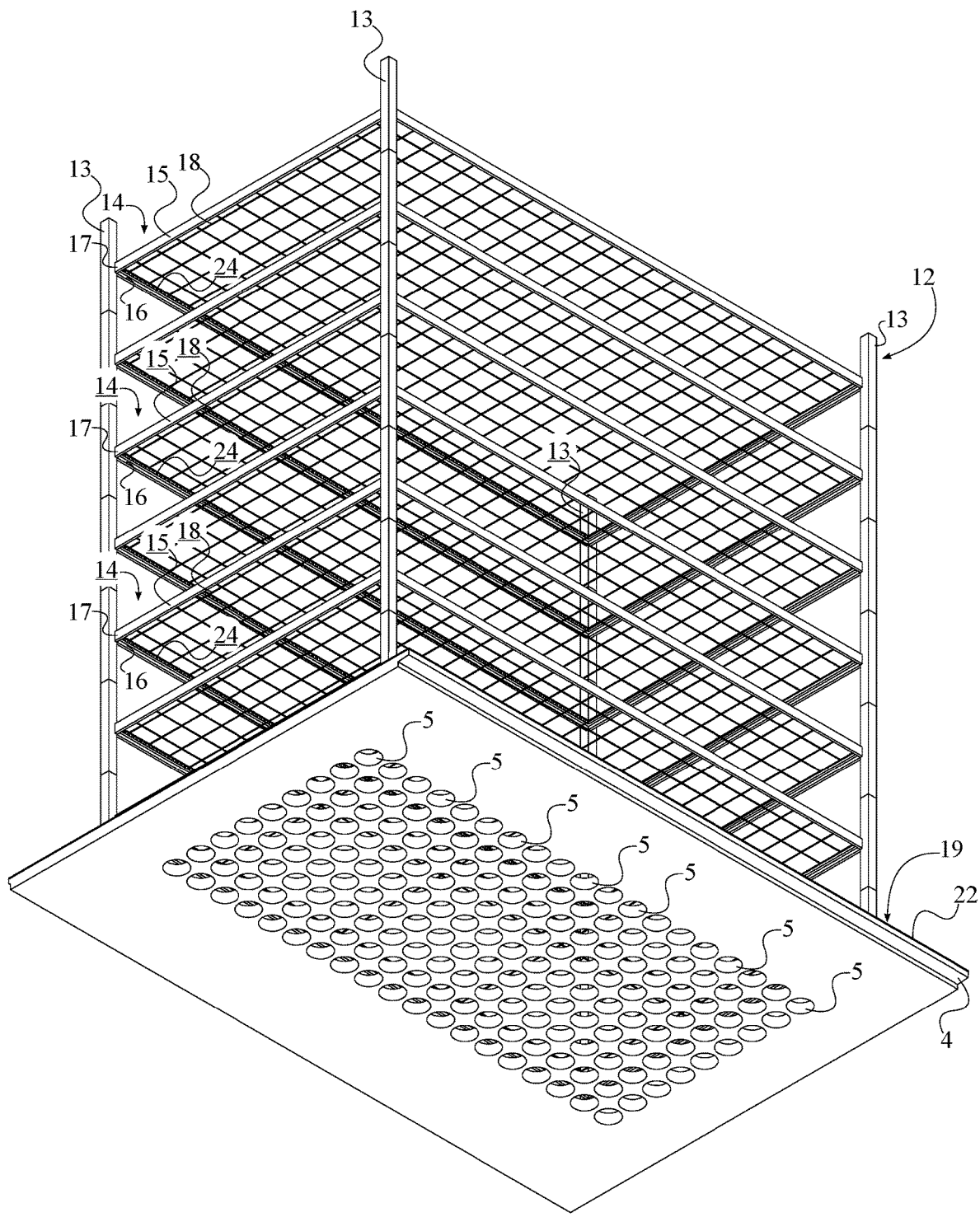
FIG. 5 is a bottom perspective view of at least one trellis and at least one perforated base plate of the present invention.
Figure 6:
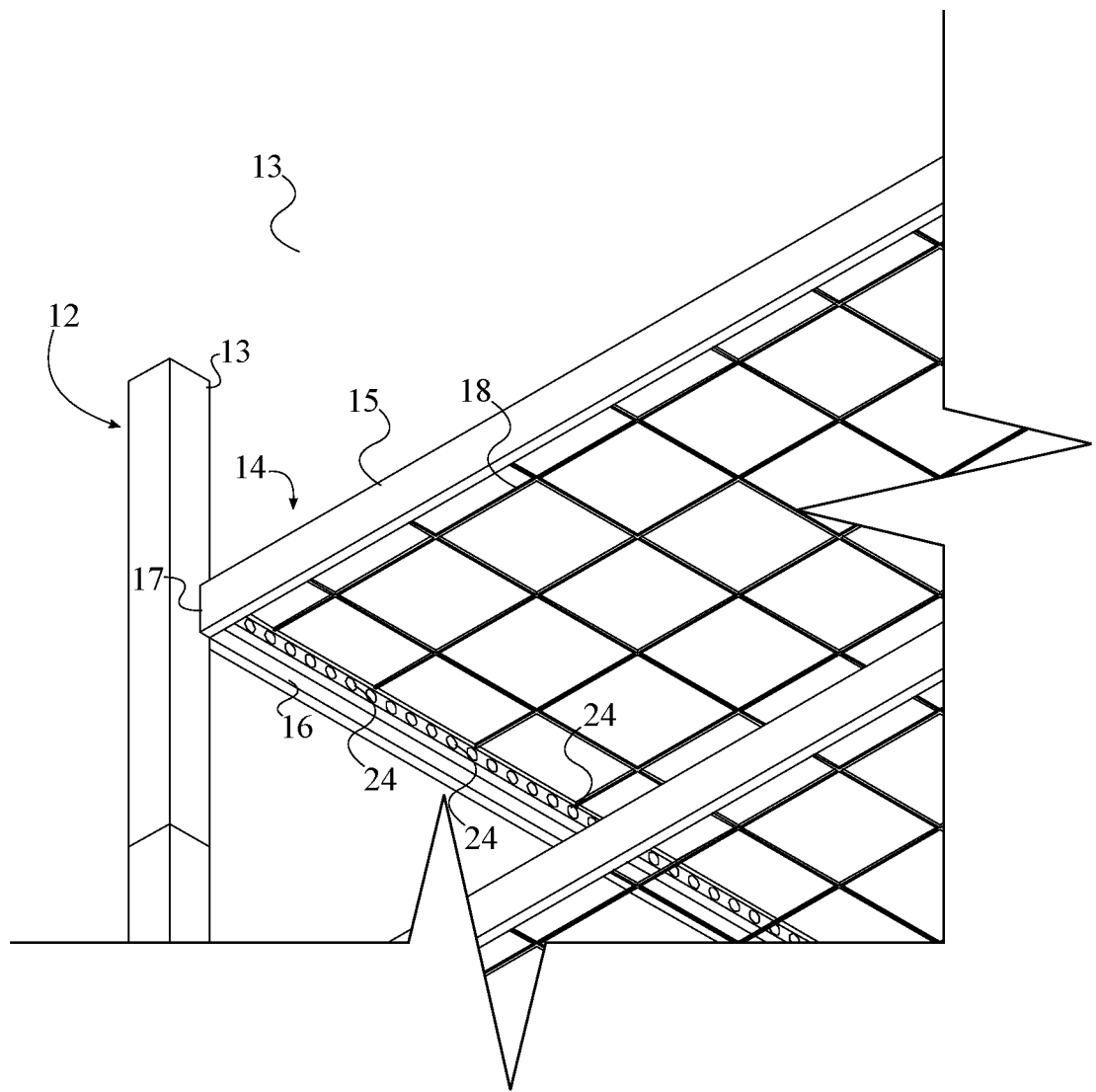
FIG. 6 is an enlarged bottom perspective view of at least one trellis and a plurality of strip lights of the present invention.

In order to uphold the plurality of strip lights 24 at various heights of the at least one trellis 12, the shelf frame 15 may comprise an inner frame surface 16 and an outer frame surface 17, seen in FIG. 5 and FIG. 6. The vine-type plants receive even lighting at lower heights along the at least one trellis 12 as each of the plurality of strip lights 24 is fixed along the inner frame surface 16 of a corresponding shelf from the plurality of lattice shelves 14. The plurality of vertical posts 13 is fixed around the outer frame surface 17, thereby allowing the plurality of strip lights 24 to continuously traverse around the plurality of lattice shelves 14.

Figure 7:
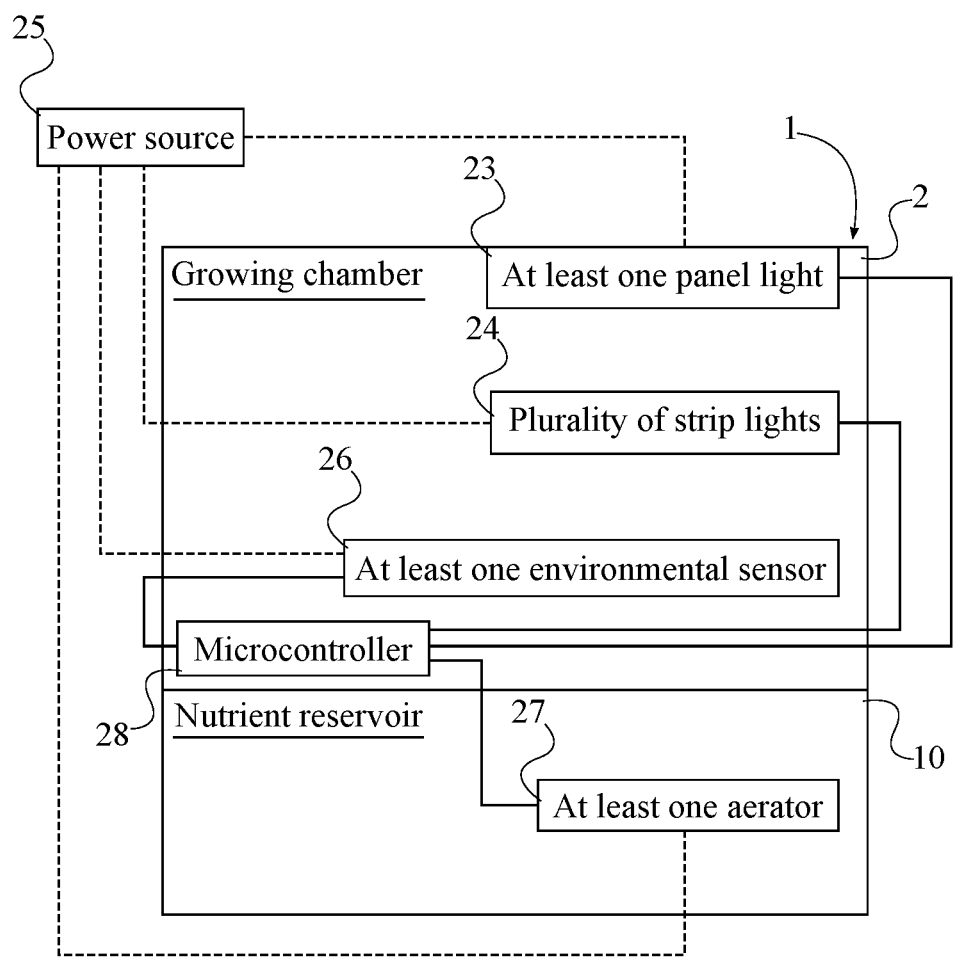
FIG. 7 is a schematic view of the electronic and electrical connections of the present invention.

For the at least one panel light 23 and the plurality of strip lights 24 to receive the necessary power to emit light, the present invention may further comprise a power source 25, seen in FIG. 7. The power source 25 may be, but is not limited to, an outlet, a portable battery, and a rechargeable battery. The power source 25 is preferably externally positioned within the housing 1 in order to access the power source 25 and to prevent the power source 25 from being exposed to the conditions within the housing 1. The at least one panel light 23 and the plurality of strip lights 24 receive the necessary power as the at least one panel light 23 and the plurality of strip lights 24 are electrically connected with the power source 25.

For the nutrient reservoir 10 to maintain desired conditions, the preferred embodiment of the present invention further comprises at least one environmental sensor 26, at least one aerator 27, and a microcontroller 28, seen in FIG. 7. The at least one environmental sensor 26 monitors certain conditions within the housing 1 such as temperature and pH levels. The at least one aerator 27 provides oxygen for the water supply and the fish with the nutrient reservoir 10. The microcontroller 28 controls the operations and displays the information outputted by the at least one environmental sensor 26 and the at least one aerator 27. In order to detect and manage the conditions within the housing 1, the at least one environmental sensor 26 and the microcontroller 28 are mounted within the housing 1. The water supply and the fish within the nutrient reservoir 10 is aerated as the at least one aerator 27 is mounted within the nutrient reservoir 10. In order for a user to monitor and control the at least one environmental sensor 26 and the at least one aerator 27, the at least one environmental sensor 26 and the at least one aerator 27 are electronically connected with the microcontroller 28. The at least one environmental sensor 26 and the at least one aerator 27 are able to operate as the at least one environmental sensor 26 and the at least one aerator 27 pump are electrically connected with the power source 25.

Although the invention has been explained in relation to its preferred embodiment, it is to be understood that many other possible modifications and variations can be made without departing from the spirit and scope of the invention as hereinafter claimed.

What is claimed is:

1. An indoor plant-growing system comprises:
a housing;
at least one trellis;
a reflective foil;
at least one panel light;
a plurality of strip lights;
the housing comprises a growing chamber and a nutrient reservoir;
the growing chamber comprises a chamber floor, at least one perforated base plate, and a plurality of slots;
the growing chamber being fixed adjacent with the nutrient reservoir;
the at least one trellis and the reflective foil being positioned within the growing chamber;
the reflective foil being superimposed across the growing chamber;
the chamber floor being positioned adjacent with and across a reservoir opening of the nutrient reservoir;
the at least one perforated base plate being removably mounted into the chamber floor;
the at least one trellis being fixed onto the at least one perforated base plate;
the plurality of slots traversing through the reflective foil, adjacent to the at least one perforated base plate;
the at least one panel light being mounted within the growing chamber, opposite the chamber floor;
the at least one panel light being oriented towards the at least one trellis;
each of the plurality of strip lights being laterally mounted within the at least one trellis;
the plurality of strip lights being positioned offset from each other along the at least one trellis; and,
the growing chamber being in fluid communication with the nutrient reservoir through the perforated base and the plurality of slots.

2. The indoor plant-growing system as claimed in claim 1, wherein:
the growing chamber further comprises a lateral wall, a chamber roof, and a door;
the lateral wall being positioned adjacent with the chamber floor, opposite the nutrient reservoir;
the chamber roof being positioned adjacent with the lateral wall, opposite the chamber floor;
the lateral wall being perimetrically fixed with the chamber floor and the chamber roof; and,
the door being operatively integrated into the lateral wall, wherein the door is used to selectively access the at least one trellis through the lateral wall.

3. The indoor plant-growing system as claimed in claim 2, wherein:
the growing chamber further comprises an access panel;
the access panel being operatively integrated into the chamber floor, wherein the access panel is used to selectively access the at least one nutrient reservoir through the chamber floor; and,
the access panel being positioned adjacent to the at least one perforated base plate.

4. The indoor plant-growing system as claimed in claim 2, wherein:
the at least one panel light being fixed across the chamber roof; and,
the at least one trellis being positioned in between the at least one perforated base plate and the at least one panel light.

5. The indoor plant-growing system as claimed in claim 2, wherein:
the reflective foil comprises a lateral portion, a roof portion, and a floor portion;
the lateral portion being superimposed across the lateral wall;
the roof portion being superimposed across the chamber roof; and,
the floor portion being superimposed across the chamber floor.

6. The indoor plant-growing system as claimed in claim 1, wherein:
the at least one trellis comprises a plurality of vertical posts and a plurality of lattice shelves;
each of the plurality of lattice shelves comprises a shelf frame and a wire grid;
the plurality of lattice shelves being serially distributed along the plurality of vertical posts;
each of the plurality of vertical posts being fixed normal to the at least one perforated base plate;
the shelf frame being positioned parallel and offset from the at least one perforated base plate;
the plurality of vertical posts being fixed around the shelf frame; and,
the shelf frame being perimetrically connected to the wire grid.

7. The indoor plant-growing system as claimed in claim 6, wherein:
the shelf frame comprises an inner frame surface and an outer frame surface;
each of the plurality of strip lights being fixed along the inner frame surface of a corresponding shelf from the plurality of lattice shelves; and,
the plurality of vertical posts being fixed around the outer frame surface.

8. The indoor plant-growing system as claimed in claim 1 further comprises:
a power source;
the power source being externally positioned with the housing; and,
the at least one panel light and the plurality of strip lights being electrically connected with the power source.

9. The indoor plant-growing system as claimed in claim 1 further comprises:
at least one environmental sensor;
at least one aerator;
a microcontroller;
a power source;
the at least one environmental sensor and the microcontroller being mounted within the housing;
the power source being externally positioned with the housing;
the at least one aerator being mounted within the nutrient reservoir;
the at least one environmental sensor and the at least one aerator being electronically connected with the microcontroller; and,
the at least one environmental sensor and the at least one aerator being electrically connected with the power source.

10. An indoor plant-growing system comprises:
a housing;
at least one trellis;
a reflective foil;
at least one panel light;
a plurality of strip lights;
the housing comprises a growing chamber and a nutrient reservoir;
the growing chamber comprises a chamber floor, at least one perforated base plate, and a plurality of slots;
the at least one trellis comprises a plurality of vertical posts and a plurality of lattice shelves;
each of the plurality of lattice shelves comprises a shelf frame and a wire grid;
the growing chamber being fixed adjacent with the nutrient reservoir;
the at least one trellis and the reflective foil being positioned within the growing chamber;
the reflective foil being superimposed across the growing chamber;
the chamber floor being positioned adjacent with and across a reservoir opening of the nutrient reservoir;
the at least one perforated base plate being removably mounted into the chamber floor;
the at least one trellis being fixed onto the at least one perforated base plate;
the plurality of slots traversing through the reflective foil, adjacent to the at least one perforated base plate;
the at least one panel light being mounted within the growing chamber, opposite the chamber floor;
the at least one panel light being oriented towards the at least one trellis;
each of the plurality of strip lights being laterally mounted within the at least one trellis;
the plurality of strip lights being positioned offset from each other along the at least one trellis;
the growing chamber being in fluid communication with the nutrient reservoir through the perforated base and the plurality of slots;
the plurality of lattice shelves being serially distributed along the plurality of vertical posts;
each of the plurality of vertical posts being fixed normal to the at least one perforated base plate;
the shelf frame being positioned parallel and offset from the at least one perforated base plate;
the plurality of vertical posts being fixed around the shelf frame; and,
the shelf frame being perimetrically connected to the wire grid.

11. The indoor plant-growing system as claimed in claim 10, wherein:
the growing chamber further comprises a lateral wall, a chamber roof, and a door;
the lateral wall being positioned adjacent with the chamber floor, opposite the nutrient reservoir;
the chamber roof being positioned adjacent with the lateral wall, opposite the chamber floor;
the lateral wall being perimetrically fixed with the chamber floor and the chamber roof; and,
the door being operatively integrated into the lateral wall, wherein the door is used to selectively access the at least one trellis through the lateral wall.

12. The indoor plant-growing system as claimed in claim 11, wherein:
the growing chamber further comprises an access panel;
the access panel being operatively integrated into the chamber floor, wherein the access panel is used to selectively access the at least one nutrient reservoir through the chamber floor; and, the access panel being positioned adjacent to the at least one perforated base plate.

13. The indoor plant-growing system as claimed in claim 11, wherein:

the at least one panel light being fixed across the chamber roof; and, the at least one trellis being positioned in between the at least one perforated base plate and the at least one panel light.

14. The indoor plant-growing system as claimed in claim 11, wherein:

the reflective foil comprises a lateral portion, a roof portion, and a floor portion;

the lateral portion being superimposed across the lateral wall;

the roof portion being superimposed across the chamber roof; and, the floor portion being superimposed across the chamber floor.

15. The indoor plant-growing system as claimed in claim 10, wherein:

the shelf frame comprises an inner frame surface and an outer frame surface;

each of the plurality of strip lights being fixed along the inner frame surface of a corresponding shelf from the plurality of lattice shelves; and, the plurality of vertical posts being fixed around the outer frame surface.

16. The indoor plant-growing system as claimed in claim 10 further comprises:

a power source;

the power source being externally positioned with the housing; and, the at least one panel light and the plurality of strip lights being electrically connected with the power source.

17. The indoor plant-growing system as claimed in claim 10 further comprises:

at least one environmental sensor;

at least one aerator;

a microcontroller;

a power source;

the at least one environmental sensor and the microcontroller being mounted within the housing;

the power source being externally positioned with the housing;

the at least one aerator being mounted within the nutrient reservoir;

the at least one environmental sensor and the at least one aerator being electronically connected with the microcontroller; and, the at least one environmental sensor and the at least one aerator being electrically connected with the power source.

* * * * *